(12) United States Patent
Drane (10) Patent No.: US 7,276,662 B2
(45) Date of Patent: Oct. 2, 2007

(54) COVER ASSEMBLY FOR AN ELECTRICAL FLOOR BOX

(75) Inventor: Mark R. Drane, Germantown, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 0 days.

(21) Appl. No.: 11/452,588

(22) Filed: Jun. 14, 2006

(65) Prior Publication Data
US 2006/0278422 A1  Dec. 14, 2006

Related U.S. Application Data

(60) Provisional application No. 60/690,368, filed on Jun. 14, 2005.

(51) Int. Cl.
*H02G 3/14* (2006.01)
(52) U.S. Cl. .................. 174/66; 174/67; 220/241; 220/242; 439/136
(58) Field of Classification Search ........... 174/66, 174/67, 53, 58, 57, 492, 50, 17 CT; 220/241, 220/242, 3.2, 3.3, 3.8; 439/535, 536, 136; D13/156, 177; D8/353; 312/328, 329; 292/336
See application file for complete search history.

(56) References Cited

U.S. PATENT DOCUMENTS

| | | | |
|---|---|---|---|
| 3,894,654 A | 7/1975 | Frankenberg | |
| 3,956,573 A | 5/1976 | Myers et al. | |
| 4,381,063 A | 4/1983 | Leong | |
| 5,010,211 A | 4/1991 | Bartee | |
| 5,032,690 A | 7/1991 | Bloom | |
| 5,148,348 A * | 9/1992 | White | 174/67 |
| 5,160,808 A | 11/1992 | Hadfield | |
| 5,272,278 A | 12/1993 | Wuertz | |
| 5,280,135 A * | 1/1994 | Berlin et al. | 174/67 |
| 5,342,993 A | 8/1994 | Siems | |
| 5,382,171 A | 1/1995 | Hofmann et al. | |
| 5,467,565 A | 11/1995 | Bowman et al. | |
| 5,575,668 A | 11/1996 | Timmerman | |
| 5,763,826 A | 6/1998 | Castellani et al. | |
| 5,783,774 A | 7/1998 | Bowman et al. | |
| 6,046,405 A | 4/2000 | Obermann | |
| 6,114,623 A | 9/2000 | Bonilla et al. | |
| 6,175,078 B1 | 1/2001 | Bambardekar et al. | |
| 6,179,634 B1 | 1/2001 | Hull et al. | |
| 6,265,662 B1 * | 7/2001 | Riedy et al. | 174/67 |
| 6,307,152 B1 | 10/2001 | Bonilla et al. | |

(Continued)

OTHER PUBLICATIONS

Thomas & Betts Electrical Components Products and Systems Technical/Specification Catalog Electrical Components Division catalog pp. J/830-J/867; J/897-J/900; M/990-M/996 (1994) (41 pages).

(Continued)

*Primary Examiner*—Angel R. Estrada
(74) *Attorney, Agent, or Firm*—Hoffmann & Baron, LLP (57) ABSTRACT

A cover assembly for a floor box including an access door for covering at least a portion of the floor box. The access door includes an opening for passage of at least one cord therethrough. The cover assembly further includes a cord door positioned to cover the opening in the access door. The cord door is removeably securable to the access door in at least two mounting orientations.

18 Claims, 5 Drawing Sheets

U.S. PATENT DOCUMENTS

| | | |
|---|---|---|
| 6,395,978 B1 | 5/2002 | Whitehead et al. |
| 6,417,450 B1 * | 7/2002 | Young .......................... 174/66 |
| 6,583,359 B1 * | 6/2003 | Cabello-Colon ............. 174/66 |
| 6,610,927 B2 * | 8/2003 | Dinh et al. ................... 174/66 |
| 6,669,041 B2 * | 12/2003 | Almond ...................... 220/3.8 |
| 6,835,890 B2 * | 12/2004 | Dinh et al. ................... 174/66 |
| 7,045,706 B1 * | 5/2006 | Lincoln et al. ............. 174/482 |
| 7,049,516 B1 * | 5/2006 | Haag et al. ................... 174/66 |
| 2003/0109172 A1 | 6/2003 | Foden et al. |
| 2004/0106313 A1 | 6/2004 | Drane |
| 2004/0123997 A1 | 7/2004 | Drane |
| 2004/0175975 A1 | 9/2004 | Drane |
| 2006/0027386 A1 | 2/2006 | Drane |

OTHER PUBLICATIONS

TradeMaster® Floor Box and Covers Pass & Seymour legrand® catalog description of Floor Box Covers (1999) (2 pages).

* cited by examiner

COVER ASSEMBLY FOR AN ELECTRICAL FLOOR BOX

CROSS-REFERENCE TO RELATED APPLICATIONS

This application claims the benefit of U.S. Provisional Patent Application Ser. No. 60/690,368 filed on Jun. 14, 2005.

BACKGROUND OF THE INVENTION

This invention pertains to floor boxes which house power and communication wires for termination and, more particularly, to a cover assembly having a smaller cord door that can be re-positioned as needed.

It is well-known to run electrical wires and telecommunications wires underneath the surface of a floor. These cables and electrical systems may be placed under the floor surface so as to be more efficient in supplying power and data/telecommunication signals in commercial buildings. The electrical cables or wires beneath the floor may be accessed through a hole in the surface of the floor. In order to provide convenient access to the wires or cables as well as the termination devices which terminate the wires, a floor box is typically placed in the hole through the floor.

Floor boxes are typically made of metallic material so that they are resistant to the outside elements, such as moisture, and are also strong enough to maintain the structural integrity of the floor. The cover used on these floor boxes oftentimes varies depending on the type of flooring to be employed, i.e. wood, tile, exposed concrete, and the like. Such covers oftentimes incorporate a smaller cord door that is used after the building is completed in order to allow wires to extend from the floor box through the cord door and to the device being powered or communicated with.

However, during construction, the exact placement of such devices is not known. Thus, it is common to find the cord door in an inconvenient/improper orientation following the installation process. Also, once the building is completed, it is quite common for the building layout to change over time and thus these powered or communicated devices will be moved to yet another location. Thus, the cover on these floor boxes will need to be adjusted once again to take into account the new location of these devices. Further, it is common for the building layout to require a new or different type of cover to be employed, such as one requiring connection to a flexible conduit. Hence the floor box and/or its cover may need to be altered accordingly.

In the past, when such a situation was encountered, it became necessary for the entire cover of the embedded floor box to be separated from the box. The cover would then be rotated (if possible) so as to properly position the smaller cord door to open in the desired direction. This required the removal of the flooring material surrounding the floor box (and oftentimes beyond) so that the fasteners securing the cover to the box could be accessed. In some cases, concrete had to be removed if the pour extended over these fasteners. Also, removal and replacement of this flooring material is costly and hence, in many situations, the cost and effort of re-positioning the cover was not deemed worth the effort.

Also, even if worth the effort of re-positioning the cover, some boxes may not permit this because the cover may only be secured to the box in one orientation. Alternatively, the box may not be square and hence the cover may only be able to be rotated 180 degrees and not 90 degrees which may be the desired cord door opening direction. Furthermore, even if the box is of some other shape that can accommodate a rotatable cover, the fastener locations may not be in alignment so that even if the box can accommodate a re-positioned cover, the fasteners cannot.

Regardless of the need required of the floor box and its cover, the design must also be adequate enough to support the weight and loading that a typical floor box is subject to and the floor box assembly must still comply with all local and national codes and or specifications pertaining to floor boxes.

It is thus an object of this invention to provide a floor box cover that incorporates a smaller cord door therein. Another object of this invention is to provide a floor box that complies with all local and national codes and specifications. A further object of this invention is to provide a floor box with a cord door such that the cord door can be adjusted so as to open in the desired direction without having to re-position or re-orient the entire cover. Still another object of this invention is to provide a cord door that can be removed and re-positioned as needed and further that can be replaced with another different cover plate if the need to do so arises. These and other objects and advantages of this invention will become evident upon further review.

SUMMARY OF THE INVENTION

The present invention, which addresses the needs for the prior art, relates to a cover assembly for a floor box. The cover assembly includes an access door for covering at least a portion of the floor box. The access door includes an opening for passage of at least one cord therethrough. The cover assembly further includes a cord door positioned to cover the opening in the access door. The cord door is removeably securable to the access door in at least two mounting orientations.

Additionally, the cord door can be pivotally secured to said access door, as well as including a locking mechanism for securing the cord door in an open position. The locking mechanism can include a biasing element to resist pivoting the cord door when the cord door is in the open position. Also, the cover assembly can further include an cord door frame secured to the perimeter of the opening in the access door and supporting the cord door. This cord door frame can include a plurality of fastening openings that align with respective openings on the access door for securing the cord door frame in at least one of the mounting orientations. Alternatively, the cord door itself can include a plurality of fastening openings that align with respective openings on the access door for securing the cord door in at least one of the mounting orientations. Further still, the cover assembly can include a frame secured to at least a portion of the floor box, with the access door supported by this frame. The access door can be pivotally secured to the floor box.

The present invention further relates to that portion of a cover assembly for a floor box that includes a cord door positioned over at least a portion of the floor box. The cord door pivotally mounts to rotate between a closed position and a first open position. The cover assembly also includes a locking mechanism secured to the cord door. The locking mechanism selectively retains the cord door in a second open position.

Additionally, the locking mechanism can include a biasing element to resist pivoting of the cord door when the cord door is in the second open position. Also, the locking mechanism can include a button engaged with the biasing element. Movement of the button causes movement of the biasing element to counter the resistance of the biasing element to allow pivoting of the cord door.

These and other objectives, features, and advantages of this invention will become apparent from the following detailed description of illustrative embodiments thereof, which is to be read in connection with the accompanying drawings.

DETAILED DESCRIPTION OF THE PREFERRED EMBODIMENT

Figure 1:
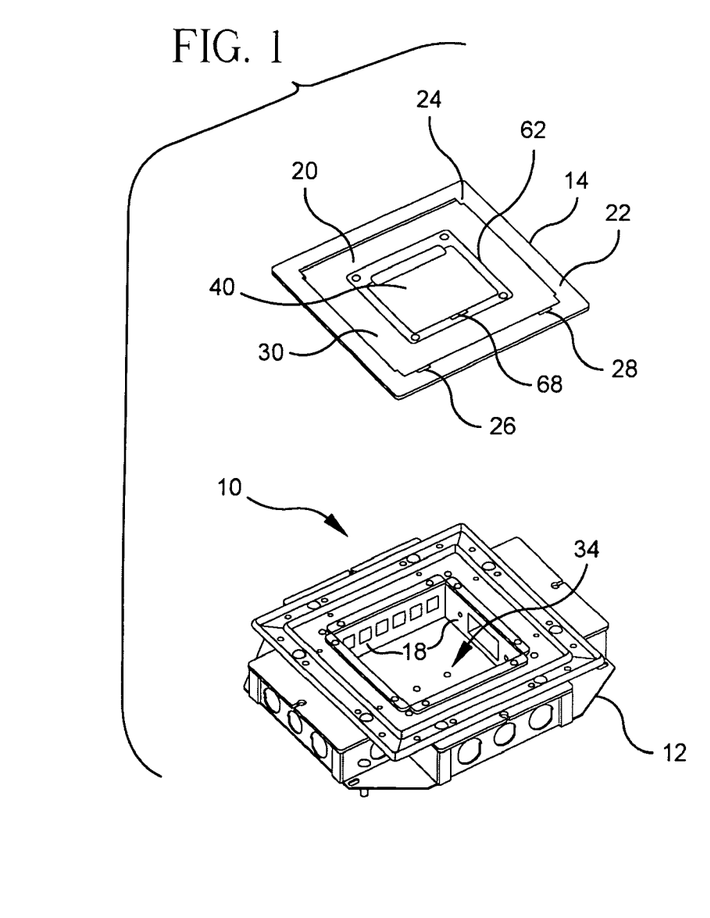
FIG. 1 is a perspective view showing the door assembly of the present invention exploded away from a floor box and with both the cover and cover door in a fully closed position.
Figure 2:
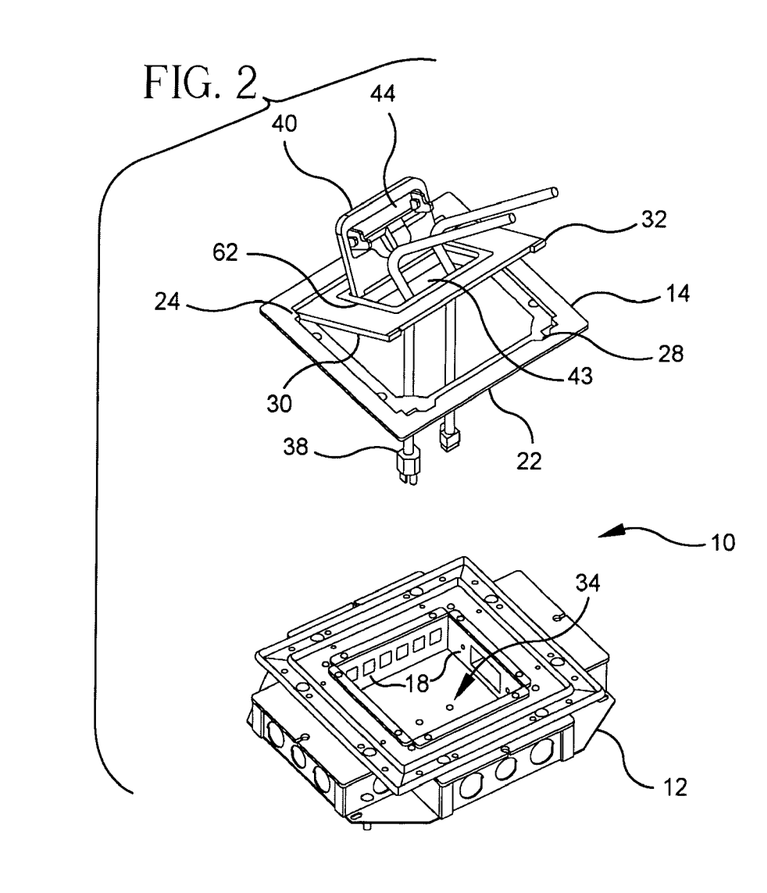
FIG. 2 is a view similar to FIG. 1 with both the cover and cord door shown in an open position and with cords extending therefrom.

Referring initially to the drawings, FIGS. 1 and 2 show a floor box assembly 10 including a floor box 12 and a cover 14. Floor box 12 may be of standard or typical construction or floor box 12 may be constructed as shown in FIGS. 1 and 2 which is described in more detail in co-pending patent application, entitled "Floor Box with Voltage Divider," commonly assigned to Thomas & Betts International, Inc., which is incorporated herein by reference.

As should be noted, floor box 12, no matter what its construction, is designed to be mounted in a floor of a building so as to provide access to power or communication wires extending through duct or conduit or the like extending within the floor. Such wiring is, in the normal fashion, mounted to receptacles, fixtures, terminals, jacks or the like that are in turn supported via plates 18 within floor box 12.

Cover 14 has a substantially planar surface or appearance 20 when in the fully closed position as shown in FIG. 1. Cover 14 is shown in an open position in FIG. 2. Cover 14 would preferably include an exterior flange 22 that is sized and configured to mate with floor box 12, hence the shape of flange 22 is likely to vary depending on the floor box 12 used. Typically, one side region of flange 22 is configured with a hinge assembly 24 while another opposite side region of flange 22 is configured with an opening assembly 26. Both hinge assembly 24 and opening assembly 26 can be of typical construction, such as a pin and socket arrangement for hinge assembly 24 and detents or recesses 28 for the opening assembly 26.

Within flange 22 of cover 14 is access door 30. This access door 30 pivots on hinge assembly 24 and it is opened via opening assembly 26, 28. Hence, a user may operate access door 30 such as by placing a tool within detents or recesses 28 and prying upwardly. It may also be desirable for access door 30 to incorporate some type of retention mechanism 32, such as a ball and spring assembly, so as to retain access door 30 in the closed position.

As shown in FIG. 1, when access door 30 is in the closed position, it is ideally flush with flange 22. However, as shown in FIG. 2, when access door 30 is in the open position, access to the interior 34 of floor box 12 is provided. Thus, access door 30 enables a user to plug and un-plug a wire 38 from its associated terminal mounted in plates 18. Also, depending on the configuration of floor box 12, access door 30 may also enable a user to re-configure or re-wire the interior 34 of floor box 12 to add or subtract power or communication fixtures. However, such reconfiguration is preferably accomplished when floor box 12 is initially being constructed and wired.

Also shown in the drawings is cord door 40 that is located within the interior of frame 62 which is itself located within the interior of access door 30. Cord door 40 may be centrally located therein or it may be positioned off center, depending on the style preferred. In any event, access door 30 is configured with an opening 43 therein that accommodates cord door 40. Hence, cord door 40 provides separate and independent access to the interior 34 of floor box 12.

Figure 3:
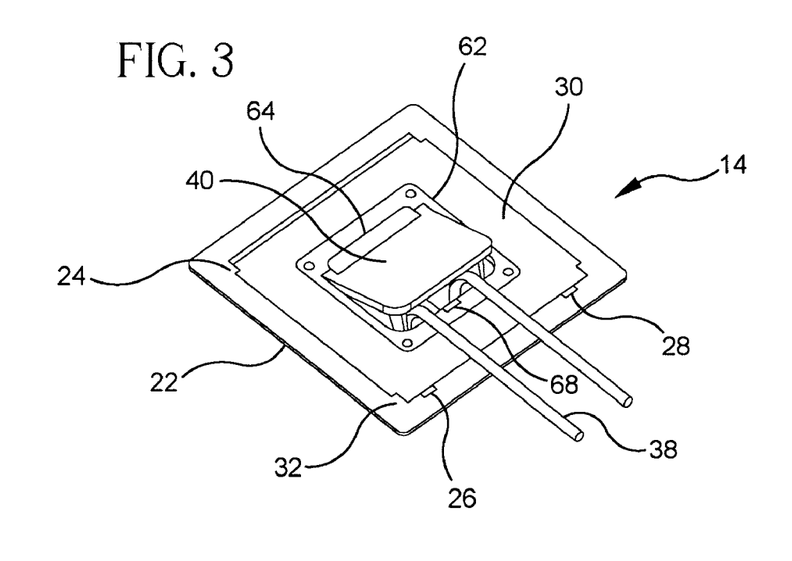
FIG. 3 is a perspective view of the cover assembly of the present invention shown with cords extending therefrom.
Figure 4:
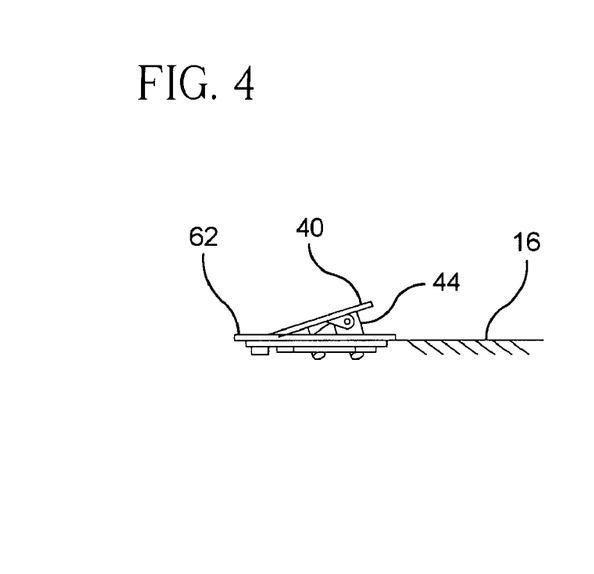
FIG. 4 is a side view of the cover assembly of FIG. 3 without the cords.
Figure 5:
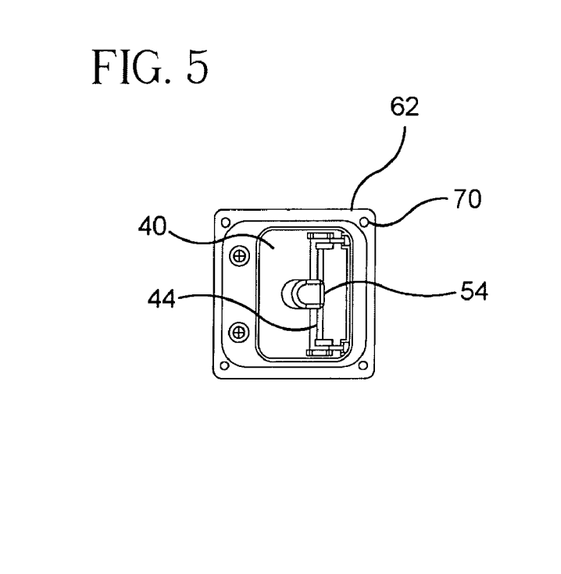
FIG. 5 is a bottom view of the cord door of FIG. 3 without the cords.
Figure 6:
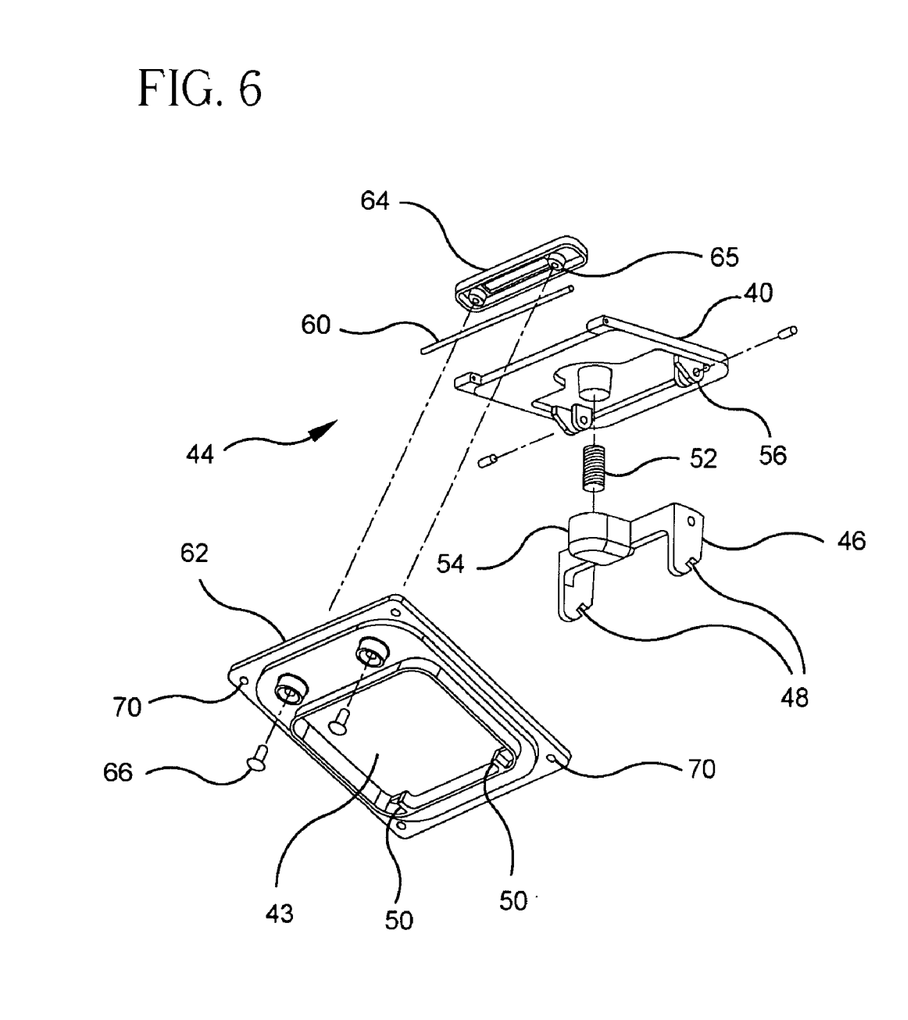
FIG. 6 is an exploded perspective view of the cord door components.
Figure 7:
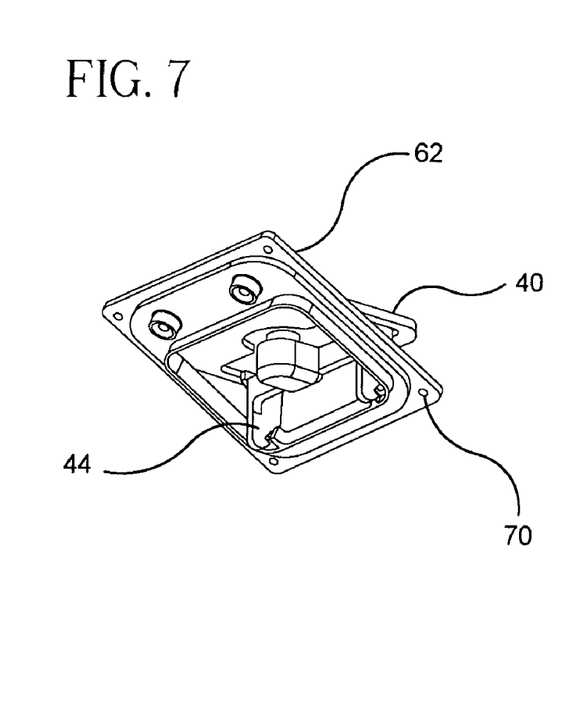
FIG. 7 is a bottom perspective view of the cord door of the present invention in an open position.

Cord door 40, when pivoted open as shown in FIGS. 2 and 3, permits wires 38 to extend from or into floor box 12. Locking mechanism 44 is employed to keep cord door 40 from collapsing upon or crimping wires 38 when they pass through opening 43. Locking mechanism 44 preferably incorporates a brace 46, as shown in FIG. 6, having detents or notches 48 at its distal end regions that fit around the perimeter of opening 43. Alternatively, the perimeter of opening 43 may include latches 50 that mate with notches 48 when cord door 40 is opened.

It should be understood that different configurations are equally likely for locking mechanism 44. As shown herein, brace 46 is biased by spring 52 to always pivot outwardly or to encourage notches 48 to enter into the engaged position with the perimeter of opening 43 or with latches 50. This can only occur when cord door 40 is opened. Once engaged, however, brace 46 can be disengaged by overcoming the bias of spring 52. Such disengagement is achieved by pivoting the button region 54 of brace 46 against the bias of spring 52. A tool can be inserted to overcome the bias of spring 52 or a user can reach one or more fingers underneath cord door 40 and push against spring 52. As shown in this embodiment, brace 46 pivots on hinge 56 so it is readily apparent how brace 46 can become automatically engaged and how it can be manually disengaged.

Now, such disengagement of cord door 40 may be desired to either cause it to close and be generally flush with access door 30 or it may be desirable to disengage cord door 40 completely so that it can be more fully opened as shown in FIG. 2. This latter position is useful when passing wires 38 through opening 42 in access door 30. The normal operating or locked open position of cord door 40 however is shown in FIG. 3, wherein brace 46 is employed to keep cord door 40 partially open and locked in place thereby permitting wires 38 to pass.

Referring once again to FIG. 6, preferably cord door 40 pivots about hinge pin 60 that is retained within frame 62 via cover plate 64. Cover plate 64 is secured to frame 62 via screws 66 and cover plate 64 contains a recessed area running along hinge pin 60. In fact, if desired, a central extent of hinge pin 60 may engage a central extent of the recessed area 65 of the cover plate 64 so that cord door 40 may be moved just enough for it to clear catch 68 on an opposite side thereof. By clearing catch 68, cord door 40 may be pivoted open. Such upward movement of cord door 40 will continue until locking mechanism 44, and particularly brace 46, impedes further rotation. Once engaged or locked, however, brace 46 will prevent cord door 40 from closing so that wires 38 can pass through opening 43 as needed without being pinched.

Figure 8:
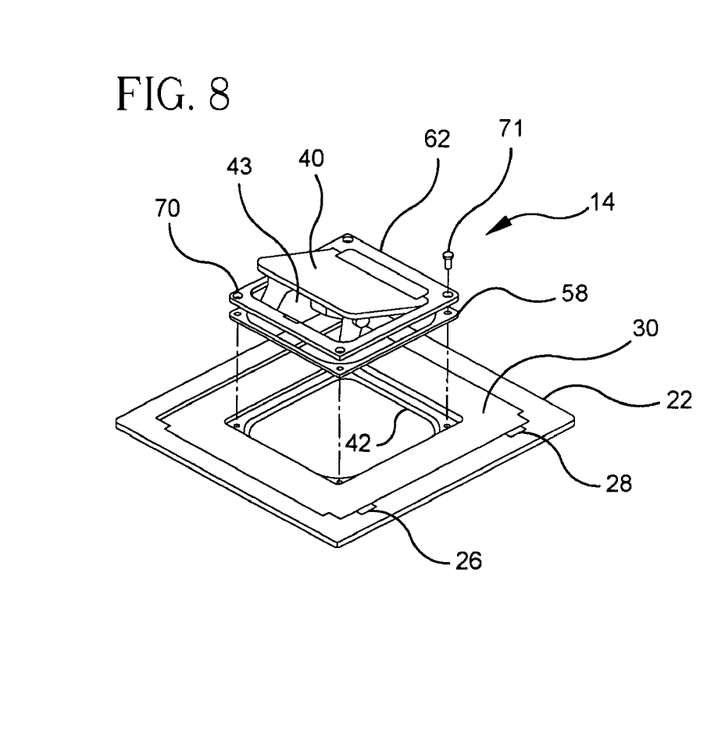
FIG. 8 is an exploded perspective view of the present invention showing the cord door component separate from the cover component.

As shown in FIG. 8, frame 62 is configured with corner fastening holes 70. These holes 70 align with similar openings in access door 30 such that if cord door 40 and particularly frame 62 needs to be rotated, it can be without the need to also rotate access door 30 or cover 14. To accomplish such rotation of frame 62, the user need only remove the fasteners 71 from holes 70, rotate both cord door 40 and frame 62, and then re-insert the fasteners 71 into holes 70. This operation is shown in FIG. 8. Thus, regardless of the orientation of access door 30, cord door 40 can be adjusted so that it opens in the right direction. This will prevent wires 38 from being bent or kinked, it will also prevent these wires from extending up over cord door 40 thereby possibly creating a tripping hazard.

Figure 9:
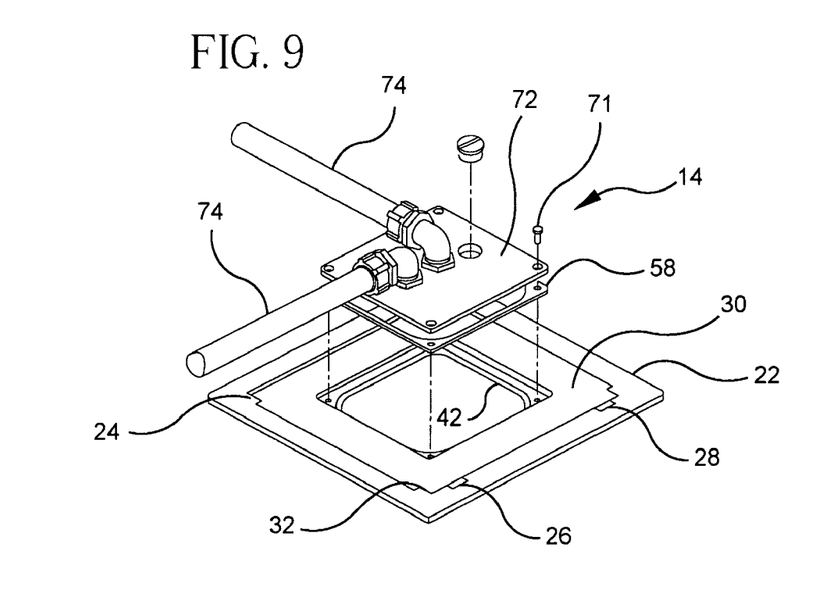
FIG. 9 is an exploded perspective view of an alternate cord door of the present invention.

For sealing purposes, as shown in FIGS. 8 and 9, a gasket 58 that seals out moisture or 'scrub water' can be incorporated between access door 30 and cord door 40. In this way, little to no water migration from outside floor box 12 will makes its way to the interior region 34.

FIG. 9 shows a variation in that cord door 40 and frame 62 are replaced with a furniture feed plate 72 that can accommodate conduit and fittings 74. Such an arrangement may be needed if the building plans call for a furniture feed plate 72 rather than a cord door 40 for use with conduit or flexible cabling.

Figure 10:
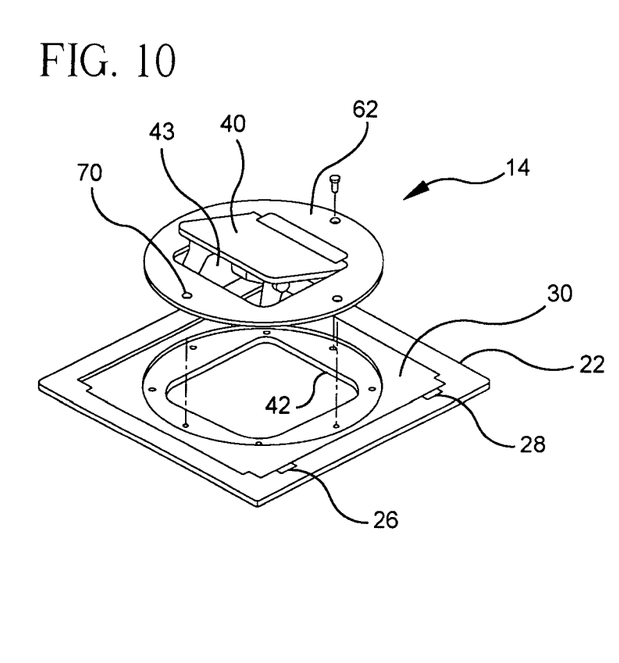
FIG. 10 is an exploded perspective view of another alternative cord door of the present invention.
Figure 11:
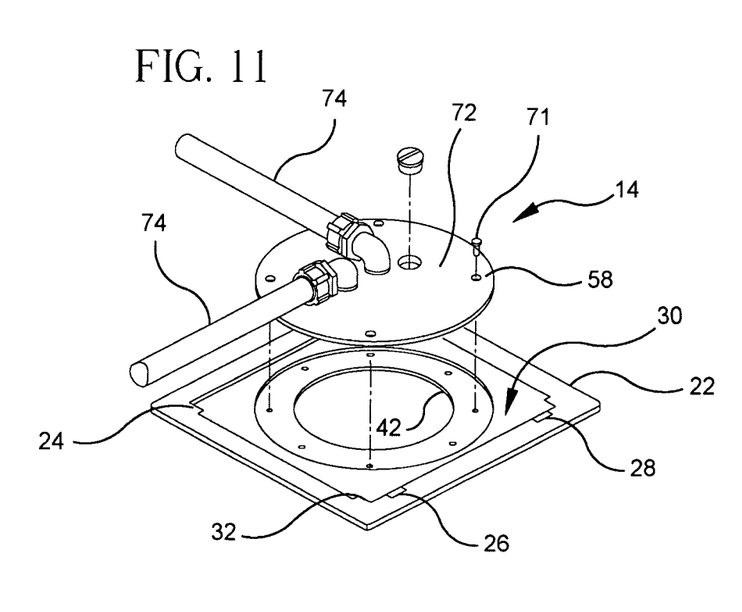
FIG. 11 is an exploded perspective view of still another alternative cord door.

Hence, whether a frame 62 is employed or whether furniture feed plate 72 is employed, it is a simple matter to now re-position such coverings in one of four different directions as may be needed. Of course, altering the shape of frame 62 or feed plate 72 (i.e. triangle, circle, hexagon, etc.) may mean that there are more or fewer such orientations. As shown in FIGS. 10 and 11, a circular version of frame 62 or feed plate 72 mates with a corresponding recess in access door 30. The embodiment shown in FIGS. 10 and 11 allow re-positioning at 45 degree intervals, or eight orientations. Thus, in the preferred embodiments prior to separation, cord door 40 and/or feed plate 72 would have a first orientation with respect to access door 30. However, upon removal and re-attachment of these covers 62, 72 facing in a different direction, there would now be a second orientation or opening direction of access door 30. It should be further understood that the shape of the cord door 40 and the associated plate 62, gasket 58 or opening 42 could additionally have their shapes altered. For example, the embodiment shown in FIG. 10 could maintain a relatively square shape for cord door 40, while providing a circular opening 42, as shown in FIG. 11.

While select preferred embodiments of this invention have been illustrated, many modifications may occur to those skilled in the art and therefore it is to be understood that these modifications are incorporated within these embodiments as fully as if they were fully illustrated and described herein.

What is claimed is:

1. A cover assembly for a floor box, comprising:
    an access door covering at least a portion of said floor box, said access door being pivotally mounted with respect to said floor box, said access door including an opening for passage of at least one cord therethrough; and
    a cord door positioned to cover said opening in said access door, said cord door being removeably securable to said access door in at least two mounting orientations, wherein said mounting orientations are rotationally offset from one another about an axis perpendicular to said opening.

2. The cover assembly according to claim 1, wherein said cord door is pivotally secured with respect to said access door.

3. The cover assembly according to claim 1, wherein said cord door includes a locking mechanism for securing said cord door in an open position.

4. The cover assembly according to claim 3, wherein said locking mechanism includes a biasing element to resist pivoting said cord door when said cord door is in said open position.

5. The cover assembly according to claim 1, further comprising:
    a first frame removeably secured to the perimeter of said opening in said access door, said first frame supporting said cord door.

6. The cover assembly according to claim 5, further comprising:
    a second frame removeably secured to at least a portion of said floor box, said second frame supporting said access door.

7. The cover assembly according to claim 5, wherein said access door is pivotally secured with respect to said floor box.

8. The cover assembly according to claim 5, wherein said first frame includes a plurality of fastening openings that align with respective openings on said access door for securing said first frame in at least one of said mounting orientations.

9. The cover assembly according to claim 1, wherein said cord door includes a plurality of fastening openings that align with respective openings on said access door for securing said cord door said mounting orientations.

10. A cover assembly for a floor box, comprising:
    an access door covering at least a portion of said floor box, said access door including an opening for passage of at least one cord therethrough; and
    a cord door positioned over at least a portion of said opening, wherein said cord door is removeably secured to said access door in more than two mounting orientations, wherein said mounting orientations are rotationally offset from one another about an axis perpendicular to said opening.

11. The cover assembly according to claim 10, wherein said cord door further includes a locking mechanism for selectively retaining said cord door in a first open position.

12. The cover assembly according to claim 11, wherein said locking mechanism includes a button whereupon movement of said button releases said cord door from said locking mechanism.

13. The cover assembly according to claim 10, wherein said
    access door is pivotally mounted with respect to said floor box.

14. The cover assembly according to claim 13, further comprising:
    a first frame removeably secured to the perimeter of said opening in said access door, said first frame supporting said cord door.

15. The cover assembly according to claim 14, wherein said first frame includes a plurality of fastening openings that align with respective openings on said access door for securing said first frame in at least one of said mounting orientations.

16. The cover assembly according to claim 13, wherein said cord door is pivotally secured with respect to said access door.

17. The cover assembly according to claim 11, wherein said cord door is selectively retained in a second open position.

18. The cover assembly according to claim 14, wherein said access door further includes a second frame secured to at least a portion of said floor box, said access door supported by said second frame.

* * * * *